US 11,682,153 B2

(12) United States Patent
Pan et al.

(10) Patent No.: US 11,682,153 B2
(45) Date of Patent: Jun. 20, 2023

(54) SYSTEM AND METHOD FOR SYNTHESIZING PHOTO-REALISTIC VIDEO OF A SPEECH

(71) Applicants: JINGDONG DIGITS TECHNOLOGY HOLDING CO., LTD., Beijing (CN); JD FINANCE AMERICA CORPORATION, Wilmington, DE (US)

(72) Inventors: Chao Pan, Sunnyvale, CA (US); Wenbo Liu, Santa Clara, CA (US); Lei Yi, Fremont, CA (US)

(73) Assignees: JINGDONG DIGITS TECHNOLOGY HOLDING CO., LTD., Beijing (CN); JD FINANCE AMERICA CORPORATION, Wilmington, DE (US)

( * ) Notice: Subject to any disclaimer, the term of this patent is extended or adjusted under 35 U.S.C. 154(b) by 453 days.

(21) Appl. No.: 17/019,203

(22) Filed: Sep. 12, 2020

(65) Prior Publication Data
US 2022/0084273 A1 Mar. 17, 2022

(51) Int. Cl.
*G10L 13/00* (2006.01)
*G06T 13/20* (2011.01)
(Continued)

(52) U.S. Cl.
CPC ........... *G06T 13/205* (2013.01); *G06N 3/049* (2013.01); *G06T 13/40* (2013.01); *G06V 40/10* (2022.01); *G10L 13/04* (2013.01)

(58) Field of Classification Search
CPC ......... G10L 13/00; G10L 13/02; G10L 13/06; G10L 13/033; G10L 13/047; G10L 13/04;
(Continued)

(56) References Cited

U.S. PATENT DOCUMENTS 6,366,885 B1   4/2002 Basu et al.
6,654,018 B1   11/2003 Cosatto et al.
(Continued)

FOREIGN PATENT DOCUMENTS

CN   109727264 A   5/2019
CN   110728971 A   1/2020
(Continued)

OTHER PUBLICATIONS

Liao, M., Zhang, S., Wang, P., Zhu, H., Zuo, X., & Yang, R. (2020). Speech2video synthesis with 3d skeleton regularization and expressive body poses. In Proceedings of the Asian Conference on Computer Vision. (Year: 2020).*
(Continued)

*Primary Examiner* — Edgar X Guerra-Erazo
(74) *Attorney, Agent, or Firm* — Scully, Scott, Murphy & Presser, P.C.

(57) ABSTRACT

A system and a method for obtaining a photo-realistic video from a text. The method includes: providing the text and an image of a talking person; synthesizing a speech audio from the text; extracting an acoustic feature from the speech audio by an acoustic feature extractor; and generating the photo-realistic video from the acoustic feature and the image by a video generation neural network. The video generating neural network is pre-trained by: providing a training video and a training image; extracting a training acoustic feature from training audio of the training video by the acoustic feature extractor; generating video frames from the training image and the training acoustic feature by the video generation neural network; and comparing the generated video frames with ground truth video frames using generative adversarial network (GAN). The ground truth video frames correspond to the training video frames.

20 Claims, 8 Drawing Sheets

(51) Int. Cl.
*G06N 3/049* (2023.01)
*G10L 13/04* (2013.01)
*G06T 13/40* (2011.01)
*G06V 40/10* (2022.01)

(58) Field of Classification Search
CPC ......... G10L 25/03; G10L 25/27; G10L 25/30; G10L 25/39; G10L 25/45; G10L 25/69; G10L 25/75; G06T 13/205; G06T 13/20; G06T 13/00; G06T 15/00; G06T 15/005; G06T 15/02; G06T 15/04; G06T 19/00; G06T 19/006; G06T 19/003; G06T 2200/08; G06T 2200/04; G06T 2213/04; G06V 10/82; G06V 10/77; G06V 10/84
See application file for complete search history.

(56) References Cited

U.S. PATENT DOCUMENTS

| | | | |
|---|---|---|---|
| 6,919,892 | B1 | 7/2005 | Cheiky et al. |
| 7,168,953 | B1 | 1/2007 | Poggio et al. |
| 7,613,613 | B2 | 11/2009 | Fields et al. |
| 10,825,224 | B2* | 11/2020 | Heller ............... G06V 40/168 |
| 11,386,900 | B2* | 7/2022 | Shillingford ........... G06N 3/044 |
| 11,514,634 | B2* | 11/2022 | Liao ................ G10L 25/57 |
| 11,551,705 | B2* | 1/2023 | Scholar ............... G10L 15/063 |
| 2009/0129631 | A1 | 5/2009 | Faure et al. |
| 2012/0280974 | A1 | 11/2012 | Wang et al. |
| 2012/0284029 | A1 | 11/2012 | Wang et al. |
| 2013/0124206 | A1 | 5/2013 | Rezvani et al. |
| 2017/0154212 | A1 | 6/2017 | Feris et al. |
| 2018/0253881 | A1 | 9/2018 | Edwards et al. |
| 2020/0160581 | A1* | 5/2020 | Heller .................. G10L 25/57 |
| 2020/0234482 | A1 | 7/2020 | Krokhalev et al. |
| 2020/0302184 | A1* | 9/2020 | Lem .................... G06V 40/179 |
| 2021/0390748 | A1* | 12/2021 | Liao ..................... G06V 40/20 |
| 2021/0390945 | A1* | 12/2021 | Zhang ................. G06N 3/044 |

FOREIGN PATENT DOCUMENTS

| | | |
|---|---|---|
| DE | 102011107295 A1 | 1/2013 |
| KR | 100300962 B1 | 10/2001 |

OTHER PUBLICATIONS

Vougioukas, K., Petridis, S., & Pantic, M. (2018). End-to-end speech-driven facial animation with temporal gans. arXiv preprint arXiv:1805.09313. (Year: 2018).*

Christoph Bregler, Michele Covell, and Malcolm Slaney, Video Rewrite: Driving Visual Speech with Audio, In Proc. SIGGRAPH., 1997.

Tony Ezzat, Gadi Geiger, and Tomaso Poggio, Trainable Video realistic Speech Animation, In Proc. SIGGRAPH., 2002.

Lijuan Wang, Wei Han, and Frank K Soogn, High Quality Lip-Sync Animation for 3D Photo-Realistic Talking Head, In Proc. ICASSP, 2012, 4529-4532.

Robert Anderson, Bjorn Stenger, Vincent Wan, and Roberto Cipolla, Expressive Visual Text-to-Speech Using Active Appearance Models, In Proc. CVPR., 2013, 3382-3389.

Sarah L Taylor, Moshe Mahier, Barry-John Theobald, and Iain Matthews, Dynamic Units of Visual Speech, In Proc. SCA, 2012.

Fried et al., Text based editing of talking-head video, In Proc. SIGGRAPH., 2019, 68:1-14.

Chen et al., Hierarchical Cross-Modal Talking Face Generation with Dynamic Pixel-Wise Loss, CVPR2019, 2019, arXiv:1905.03820.

Zhou et al. Talking Face Generation by Adversarial Disentangled Audio-Visual Representation, AAAI2019, 2019, arXiv:1807.07860.

Vougioukas et al. Realistic Speech-Driven Facial Animation with GANs, 2019, arXiv:1906.06337.

International Search Report and Written Opinion dated Nov. 25, 2021 issued in PCT/CN2021/117392, 8 pages.

* cited by examiner

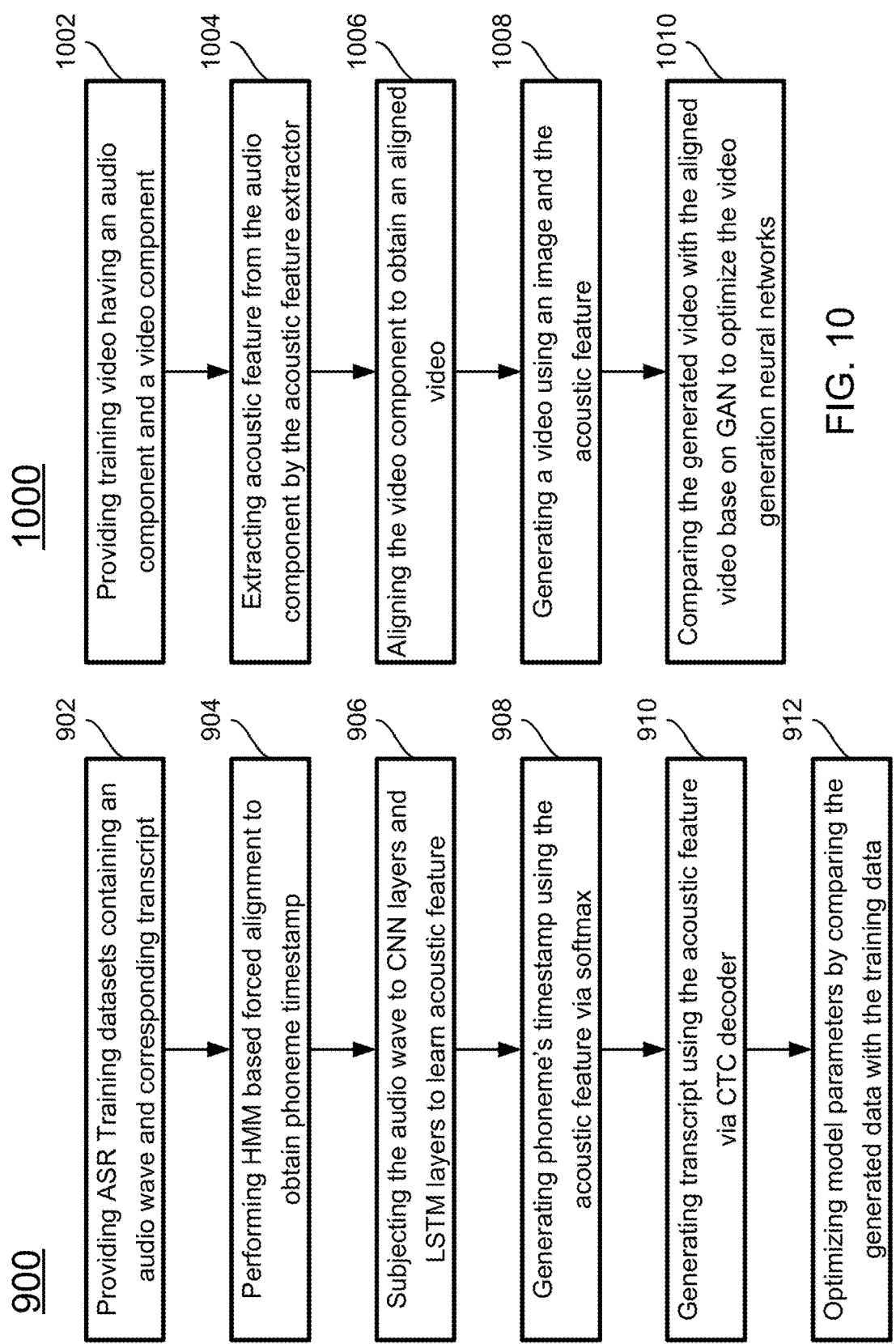

SYSTEM AND METHOD FOR SYNTHESIZING PHOTO-REALISTIC VIDEO OF A SPEECH

CROSS-REFERENCES

Some references, which may include patents, patent applications and various publications, are cited and discussed in the description of this invention. The citation and/or discussion of such references is provided merely to clarify the description of the present disclosure and is not an admission that any such reference is "prior art" to the invention described herein. All references cited and discussed in this specification are incorporated herein by reference in their entireties and to the same extent as if each reference were individually incorporated by reference.

FIELD OF THE INVENTION

The present disclosure relates generally to the field of digital human, and more particularly to a system and method for generating a photo-realistic video of a person's speech from a text.

BACKGROUND OF THE INVENTION

The background description provided herein is for the purpose of generally presenting the context of the invention. Work of the presently named inventors, to the extent it is described in this background section, as well as aspects of the description that may not otherwise qualify as prior art at the time of filing, are neither expressly nor impliedly admitted as prior art against the present disclosure.

Conventional facial animation approaches have been successfully applied to film industry and visual effects (VFX) in terms of computer-generated imagery (CGI). Within this context, the task often involves a large group of professional animators being employed in conducting three-dimensional (3D) body scanning with red-green-blue depth (RGBD) cameras or motion capture devices, followed by postprocessing and rendering using professional CG software such as Industrial Light & Magic (ILM) and Digital Domain. The process is both costly and difficult. For example, 3D facial animation is costly in generating photo-realistic facial video especially on the accurate creation of skin texture details such as pore definition, sweat and natural blemishes.

Another important approach is the combination of computer vision and CGI method. The majority of research in this domain focuses on mapping audio features to visual features and using computer graphics methods to generate faces. The input of the model can be audio or phonemes. The output representations could be 2D/3D facial (mainly mouth and/or jaw) landmarks, facial action units, expression coefficients of a parametric face/head model, 3D dense mesh, and viseme curves. The approach includes, for example, lip sync for character animation, where representations can be retargeted to existing rigs for animation. Representations chosen for this kind of application are usually animator centric and can be post-edited for refinement.

More recently, there has been an increasing interest in video generation with end to end methods. For example, generative adversarial networks (GANs) consist of two major components: a generative network and a discriminative network. The generator aims to produce realistic videos and the discriminator aims to distinguish real and generated videos. The recurrent neural network (RNN) based generator which disentangles latent spaces for motion and content achieves the state-of-the-art performance. However, due to the constraints of the alignments methods they use, GANs based video generation are either jittering, or too fake (most parts of the face are static while only the mouth has movement). Besides, all GAN based methods require lots of training data, which are expensive to collect.

Therefore, an unaddressed need exists in the art to cost-effectively generate photo-realistic video of a speech with limited training.

SUMMARY OF THE INVENTION

In certain aspects, the present disclosure relates to a method for obtaining a photo-realistic video of a talking person from a text. In certain embodiments, the method includes:

providing, by a computing device, the text for generating the photo realistic video and an image of the talking person;

synthesizing a speech audio from the text;

extracting an acoustic feature from the speech audio by an acoustic feature extractor, where the acoustic feature is independent from speaker of the speech audio; and generating the photo-realistic video from the acoustic feature and the image of the talking person by a video generation neural network.

In certain embodiments, the video generating neural network is pre-trained by: providing training video of a training talking person and a training image of the training talking person, where the training video comprises a plurality of training video frames and a corresponding training audio;

extracting a training acoustic feature from the training audio by the acoustic feature extractor;

generating a plurality of video frames from the training image and the training acoustic feature by the video generation neural network; and comparing the generated video frames with ground truth video frames using generative adversarial network (GAN), where the ground truth video frames correspond to the training video frames.

In certain embodiments, each of the ground truth video frames is prepared by:

separating, in corresponding one of the training video frames, outline of the training talking person into a head portion and an upper torso portion;

rotating the head portion to be consistent with a head pose in a reference frame selected from the training video frames;

shifting the head portion and the upper torso portion to be consistent with positions of a head portion and an upper torso portion in the reference frame; and blending pixels along interface between the head portion and the upper torso portion in the ground truth video frame.

In certain embodiments, the step of comparing the generated video frames with the ground truth video frames using GAN includes: comparing each of the generated video frames with corresponding one of the ground truth video frames to determine quality of the generated video frame; and comparing the generated video frames with the ground truth video frames to determined quality of sequential variation of the generated video frames.

In certain embodiments, the video generation neural network includes a batch normalization layer, a leaky relu layer, and a deconvolution layer.

In certain embodiments, before pre-training of the video generating neural network, the acoustic feature extractor is pre-trained by:

providing a training audio wave, a training transcript corresponding to the training audio wave, and a training phoneme timestamp in the training audio wave;

transforming the training audio wave to Mel-frequency cepstral coefficients (MFCCs);

performing a convolutional neural network (CNN) and a long short-term memory (LSTM) on the MFCCs to obtain a training audio wave vector;

performing a softmax analysis on the training audio wave vector to obtain a predicted phoneme timestamp;

performing a connectionist temporal classification (CTC) decoding on the training audio wave vector to obtain predicted transcript; and comparing the predicted phoneme timestamp and the predicted transcript respectively with the training phoneme timestamp and the training transcript.

In certain embodiments, the training phoneme timestamp is obtained by performing a hidden Markov model (HMM) based force alignment on the training transcript and the training audio wave. In certain embodiments, training script includes a Chinese character script and a Pinyin script corresponding to pronunciation of the Chinese character script.

In certain embodiments, the step of synthesizing the speech audio from the text is performed by a multi-speaker speech synthesizer.

In certain embodiments, the method further includes, after generating the photo-realistic video by the video generation neural network:

providing a head moving pattern;

separating outline of the talking person in each of frames of the photo-realistic video into a head portion and an upper torso portion;

rotating the head portion in each of the frames to be consistent with the head moving pattern;

shifting the head portion and the upper torso portion in each of the frames to be consistent with positions of head portion and upper torso portion in the head moving pattern;

and blending pixels along interface between the head portion and the upper torso portion in each of the frames.

In certain embodiments, the method further includes, after generating the photo-realistic video by the video generation neural network:

providing a closed-eye frame with closed eyes;

detecting facial landmarks in a target frame of the photo-realistic video, wherein the target frame and a plurality of frames before and after the target frame have open eyes;

rotating, scaling, and translating the closed-eye frame onto the target frame;

adjusting color balance between the closed-eye frame and the target frame;

blending eye area features form the closed-eye frame on top of the target frame;

estimating optical flow between the target frame and an adjacent frame, wherein the adjacent frame is after the target frame and within a pre-determined number of frames in the photo-realistic video; and interpolating frames between the target frame and the adjacent frame based on the optical flow.

In certain embodiments, instead of interpolating frames, the method only changes the eye features of the adjacent frame. In certain embodiments, the method changes eye features for a number of frames before and after the target frame. For example, the method may change eye features of three frames before the target frame and three frames after the target the frame, such that the seven frames constitutes a complete eye blink.

In certain aspects, the present disclosure relates to a system for generating a photo-realistic video of a talking person from a text. The system includes a computing device. The computing device has a processor and a storage device storing computer executable code. The computer executable code includes an acoustic feature extractor and a video generation neural network. The computer executable code, when executed at the processor, is configured to:

provide the text for generating the photo-realistic video and an image of the talking person;

synthesize a speech audio from the text;

extract an acoustic feature from the speech audio by the acoustic feature extractor, where the acoustic feature is independent from speaker of the speech audio; and generate the photo-realistic video from the acoustic feature and the image of the talking person by the video generation neural network.

In certain embodiments, the video generating neural network is pre-trained by: providing training video of a training talking person and a training image of the training talking person, wherein the training video comprises a plurality of training video frames and a corresponding training audio;

extracting a training acoustic feature from the training audio by the acoustic feature extractor;

generating a plurality of video frames from the training image and the training acoustic feature by the video generation neural network; and comparing the generated video frames with ground truth video frames using generative adversarial network (GAN), where the ground truth video frames correspond to the training video frames.

In certain embodiments, each of the ground truth video frames is prepared by:

separating, in corresponding one of the training video frames, outline of the training talking person into a head portion and an upper torso portion;

rotating the head portion to be consistent with a head pose in a reference frame selected from the training video frames;

shifting the head portion and the upper torso portion to be consistent with positions of a head portion and an upper torso portion in the reference frame; and blending pixels along interface between the head portion and the upper torso portion in the ground truth video frame.

In certain embodiments, the step of comparing the generated video frames with the ground truth video frames using GAN includes: comparing each of the generated video frames with corresponding one of the ground truth video frames to determine quality of the generated video frame; and comparing the generated video frames with the ground truth video frames to determined quality of sequential variation of the generated video frames.

In certain embodiments, before pre-training of the video generating neural network, the acoustic feature extractor is pre-trained by:

providing a training audio wave, a training transcript corresponding to the training audio wave, and a training phoneme timestamp in the training audio wave;

transforming the training audio wave to Mel-frequency cepstral coefficients (MFCCs);

performing a convolutional neural network (CNN) and a long short-term memory (LSTM) on the MFCCs to obtain a training audio wave vector;

performing a softmax analysis on the training audio wave vector to obtain a predicted phoneme timestamp;

performing a connectionist temporal classification (CTC) decoding on the training audio wave vector to obtain predicted transcript; and comparing the predicted phoneme timestamp and the predicted transcript respectively with the training phoneme timestamp and the training transcript.

In certain embodiments, the training phoneme timestamp is obtained by performing a hidden Markov model (HMM) based force alignment on the training transcript and the training audio wave.

In certain embodiments, the computer executable code is further configured to, after generating the photo-realistic video:

provide a head moving pattern;

separate outline of the talking person in each of frames of the photo-realistic video into a head portion and an upper torso portion;

rotate the head portion in each of the frames to be consistent with the head moving pattern;

shift the head portion and the upper torso portion in each of the frames to be consistent with positions of head portion and upper torso portion in the head moving pattern;

and blend pixels along interface between the head portion and the upper torso portion in each of the frames.

In certain embodiments, the computer executable code is further configured to, after generating the photo-realistic video by the video generation neural network: provide a closed-eye frame with closed eyes;

detect facial landmarks in a target frame of the photo-realistic video, wherein the target frame and a plurality of frames before and after the target frame have open eyes;

rotate, scale, and translate the closed-eye frame onto the target frame;

adjust color balance between the closed-eye frame and the target frame;

blend eye area features form the closed-eye frame on top of the target frame;

estimate optical flow between the target frame and an adjacent frame, wherein the adjacent frame is after the target frame and within a pre-determined number of frames in the photo-realistic video; and interpolate frames between the target frame and the adjacent frame based on the optical flow.

In certain aspects, the present disclosure relates to a non-transitory computer readable medium storing computer executable code. The computer executable code, when executed at a processor of a computing device, is configured to perform the method described above.

These and other aspects of the present disclosure will become apparent from following description of the preferred embodiment taken in conjunction with the following drawings and their captions, although variations and modifications therein may be affected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

FIG. 9 schematically depicts a method for training an acoustic feature extractor according to certain embodiments of the present disclosure.

FIG. 10 schematically depicts a method for training a video generation neural network according to certain embodiments of the present disclosure.

DETAILED DESCRIPTION OF THE INVENTION

Figure 1:
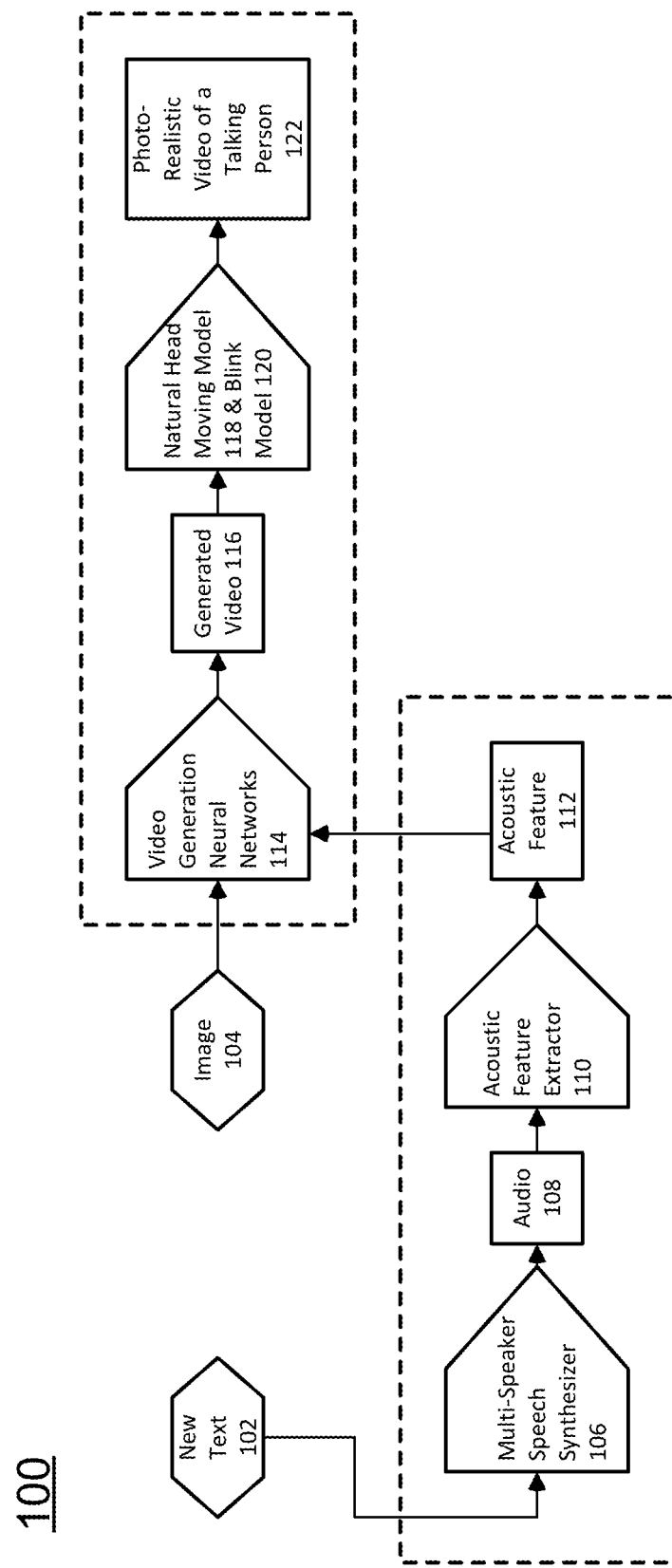
FIG. 1 schematically depicts a flow chart for generating a photo-realistic video of a talking person according to certain embodiments of the present disclosure.

The present disclosure is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "plurality" means two or more. As used herein, the terms "comprising," "including," "carrying," "having," "containing," "involving," and the like are to be understood to be open-ended, i.e., to mean including but not limited to.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this invention will be thorough and complete, and will fully convey the scope of the present disclosure to those skilled in the art.

In certain aspects the present disclosure relates to a system for synthesizing a person's talking video. In certain embodiments, given a paragraph of script, a voice, and a speaker's appearance, the system of the disclosure is capable of generating a piece of video about the speaker reading the script with synthesized speech. The synthesized video is photo-realistic, and the lips movement is synchronized with the corresponding speech. In certain embodiments, the system first synthesizes the paragraph of script to speech via text-to-speech technique, and then uses the synthesized speech audio to drive and generate the speaker's talking video. In other words, the present disclosure converts a piece of text to a video of a specific person talking in two steps: script to audio, and audio to video.

In certain embodiments, the system is an identification (ID) independent text-driven photo-realistic facial animation system, and the system is based on GANs, body pose estimation, face landmark estimation, optical flow estimation and interpolation. The advantages of the system include, for example:

(1) ID independent. The facial movement, especially the lip movement of the system of the present disclosure can be driven by the audio synthesized from voices never seen in the training data. Specifically, the system includes an acoustic feature extractor. When a speech synthesis module synthesizes an audio with different voices and languages, the acoustic feature extractor can extract speaker-independent features from the synthesized audio. The speaker-independent features can then be used to drive the lip movement. In comparison, previous GAN based system either fails to generalize to an unseen voice, or requires a large amount of expensive audio-visual paired data to be able to generalize.

(2) Photo realistic and temporally coherent. The talking video generated by previous GAN based system looks fake. Sometimes, the speaker in the video keeps still; sometimes the lips of the speaker moves but his head is still; sometimes the speaker in the video jitters; sometimes the speaker in the video does not jitter but the video looks like an animated cartoon and appears unreal. The reasons include that the previous GAN based system lacks proper alignment preprocessing; fails to learn sequential features properly; and uses facial landmarks, action units and parametric mesh as intermediate representation of mouth shape, which suffer from great loss of details.

In comparison, certain embodiments of the present disclosure consider both proper video alignment preprocessing and strong sequential feature extraction. As a result, the movement of the speaker's head is smooth, and the generated talking video is smooth and natural. Further, the present disclosure uses an encoder-decoder structure to auto-learn a latent representation of mouth shape, jaw, laryngeal prominence, etc. As the latent representation is learned directly from video frames, the latent representation can capture the finest changes of facial muscles and micro-expressions, and generates natural talking videos.

By the above improvement, certain embodiments of the system of the present disclosure can generate photo realistic and temporally coherent facial videos. The frame-level adversarial training with discriminator could ensure that the generated frames are detailed and realistic, whereas the temporal discriminator plays an important role in audio-visual correspondence and seamless transitions between frames.

(3) Generating more than face. The system of the present disclosure can generate whole upper body of the speaker because of the video alignment method. In comparison, previous GAN based method such as end-to-end speech-driven facial animation with temporal GANs by Vougioukas et al. is only able to generate talking faces.

(4) Natural facial expression. With large dataset, natural facial expression (head pose, eye gaze movement) could be automatically learnt by network. However, natural facial expression would become a really challenging problem with small dataset or dataset with poor quality (especially when the human in the training data almost has no head motion or eye movement) since the model would be fully dependent on training data. As an improvement, the head pose/landmark estimation and video post processing used in the system of the present disclosure can generate video with natural head motion and facial expression using limited training data.

(5) Cost efficiency. In the system of the present disclosure, the data acquisition can be done with consumer cameras other than expensive 3D scanning devices in CGI method. Once the entire pipeline is streamlined, the system of the present disclosure can be easily set up with minimal device and personnel training costs. Furthermore, the system does not need tons of a target person's video (as training data) to be able to do this. The system can generate a video of the target person speaking desired content in a supported language, with as little as five minutes of his/her training data.

FIG. 1 schematically depicts the overall system for generating a photo-realistic video from a given texts according to certain embodiments of the disclosure. As shown in FIG. 1, the system 100 includes two parts: from text to audio, and from audio to video. For a given script or new text 102 and a given image 104 for a target speaker, a multi-speaker text-to-speech synthesizer 106 converts the new text 102 to an audio 108, where the audio 108 may correspond to a speaker defined in the multi-speaker speech synthesizer 106. An acoustic feature extractor 110 then extracts acoustic feature 112 from the audio 108, where the acoustic feature 112 is a generalized feature that is independent from any speaker (ID independent). The acoustic feature 112, together with the image 104, drive the video generation neural network 114 to generate video 116. The video 116 includes the target speaker with upper-half body speaking the text 102 in a natural way with lip movement. The video 116 may be further improved by a natural head moving model 118 and a blink model 120 to add movement of the speaker's head and eye blink of the speaker's eyes, so as to obtain photo-realistic video of a talking person 122. The talking person in the video 122 is the speaker shown in the image 104. Kindly note that the post-processing by the natural head moving model 118 and blink model 120 is optional, and the generated 116 may be the intended photo-realistic speaking video.

The multi-speaker speech synthesizer 106 uses a text-to-speech (TTS) technique to synthesize the audio 108 from the new text 102. In certain embodiments, the multi-speaker speech synthesizer 106 is designed based on a state-of-the-art attention-based text-to-speech model, such as Tacotron 2, which is incorporated herein by reference in its entirety. The synthesized audio 108 sounds like a real person, natural and with high fidelity. In certain embodiments, the multi-speaker speech synthesizer 106 may generate a speech of a specific speaker according to the instruction of a user.

Figure 2A:
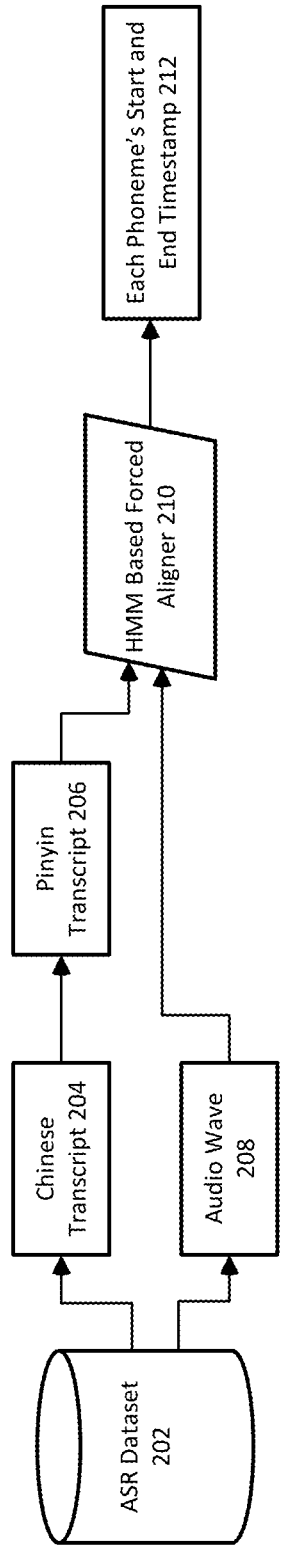
FIG. 2A schematically depicts preparation of training data for an acoustic feature extractor according to certain embodiments of the present disclosure.
Figure 2B:
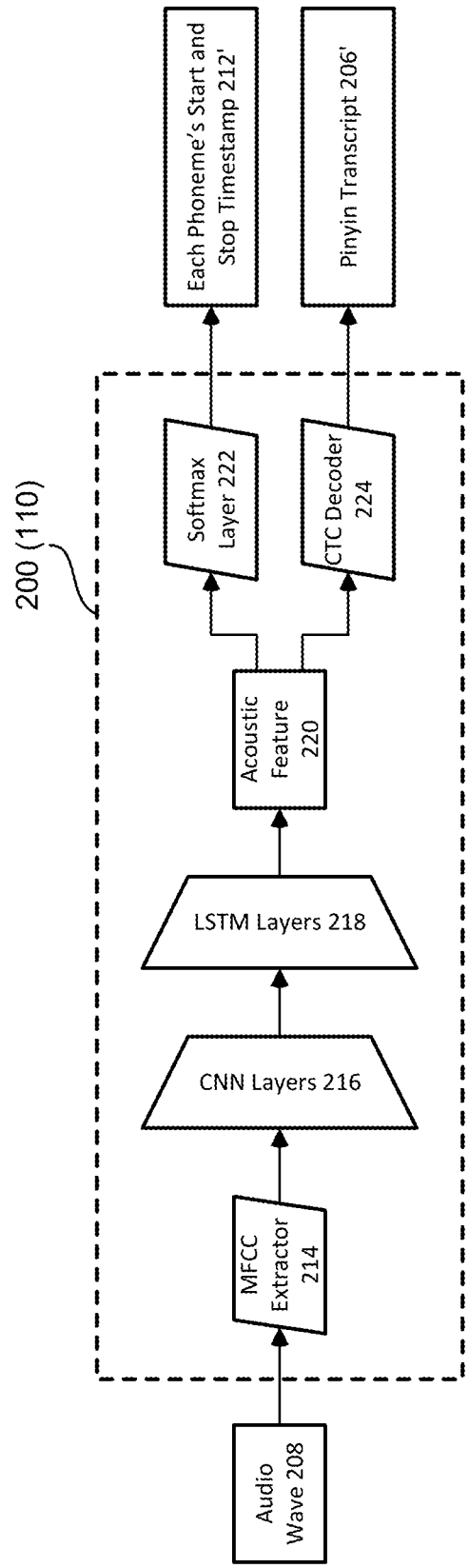
FIG. 2B schematically depicts training of an acoustic feature extractor according to certain embodiments of the present disclosure.

The acoustic feature extractor 110 is pretrained and is used to extract the generalized acoustic feature 112 from the audio 108. The training of the acoustic feature extractor 110 is illustrated in FIG. 2A and FIG. 2B, where FIG. 2A schematically depicts preparation of training data for the acoustic feature extractor 200 according to certain embodiments of the present disclosure, and FIG. 2B schematically depicts training of the acoustic feature extractor 200 using the prepared training data. Here the acoustic feature extractor 200 is a coded module, and the acoustic feature extractor 110 shown in FIG. 1 is the well-trained version of the module 200. As shown in FIG. 2A, a proprietary automatic speech recognition (ASR) dataset 202 is used as training data. The ASR dataset 202 is recorded by multi-speakers so as to generalize the audio features, and the ASR dataset contains audio wave 208 and its corresponding transcript. In certain embodiments, each ASR dataset may be a sentence having a length of five to ten seconds. In certain embodiments, the transcript is a Chinese transcript 204, and during training data preparation, the Chinese transcript 204 is converted into Pinyin transcript 206, where Pinyin is the Romanization of the Chinese characters based on their pronunciation. In certain embodiments, when the transcript is in English or some other languages, there is no need to convert the text transcript to transcription in pronunciation format. The Pinyin transcript 206 and the audio wave 208 are subjected to a hidden Markov model (HMM) based forced aligner 210 to learn the start and end timestamp for each phoneme of Pinyin. The performance of the HMM based forced aligner 210 is unsupervised, and the learned result is start and end timestamp 212 of each phoneme in the pinyin transcript 206. The start and end timestamp of the phonemes 212 are treated as ground truth for framed-based phoneme classification. For example, if each of the audio frames 10 and 20 of the audio wave 208 correspond to the pronunciation of "I," then each of the frames 10 and 20 is classified as the phoneme of "I." In certain embodiments, the number of pronunciations of Chinese characters is about 400, which is used as the classification of the phonemes. The classification of the 400 phonemes may be pretrained and then be used here. In certain embodiments, the HMM based forced aligner 210 is Montreal forced aligner. The Pinyin transcript 206, the audio wave 208, and the learned start and end timestamp 212 of the phonemes corresponding to the Pinyin transcript 206 are used for the training of the acoustic feature extractor 200.

As shown in FIG. 2B, the acoustic feature extractor 200 is a multi-task neural network model, which is trained to, from the input audio wave 208, recognize Pinyin transcript 206' and generate each phoneme's start and stop timestamp 212'. The recognized Pinyin transcript 206' is compared with the ground truth Pinyin transcript 206, and the generated phoneme's start and stop timestamp 212' is compared with the ground truth each phoneme's start and stop timestamp 212 during the training. In certain embodiments, when the audio wave 208 of one piece of training data is inputted to the acoustic extractor 200 for the training, a mel-frequency cepstral coefficients (MFCC) extractor 214 is used to extract feature vectors (or MFCC features) from the raw audio wave 208. MFCC extractor 214 is a preprocessing of the acoustic extractor 210. Here MFCC are coefficients that collectively make up an MFC, and the MFC is a representation of the short-term power spectrum of the audio wave 208, based on a linear cosine transform of a log power spectrum on a nonlinear mel scale of frequency. In certain embodiments, the audio data preparation may also use methods other than MFCC extraction. After MFCC extraction, the MFCC features of the audio wave 208 are inputted to the convolutional neural network (CNN) layers 216 and the LSTM layers 218 to generate acoustic features 220. The acoustic features 220 are frame-level feature vectors sampled at discrete time points, which indicates the probability of phoneme at corresponding time. The acoustic feature 220 is further processed by a softmax layer 222 to obtain each phoneme's start and stop timestamp 212', and the acoustic feature 220 is also processed by a connectionist temporal classification (CTC) decoder 224 to obtain the Pinyin transcript 206'. By comparing the obtained each phoneme's start and stop timestamp 212' and the Pinyin transcript 206' with their ground truth 206 and 212 prepared as shown in FIG. 2A, the acoustic extractor 200 can be trained using the differences as penalties. After training, the acoustic feature extractor 200 (110) can receive an audio sample, generate acoustic feature 220 from the audio sample, and provide the generated acoustic feature 220 to the video generation neural network 114. The acoustic feature 220 is speaker-independent because the phoneme's content information (Pinyin transcript 206') and the phoneme's duration information (each phoneme's start and stop timestamp 212') are independent of a person's voice, pitch, timbre, etc. Kindly note that using a multitask model, such as the acoustic feature extractor 200 (110), to perform speech recognition and phoneme classification, and then use the result from this speaker-independent acoustic feature extractor 200 (110) to provide lip synchronization, has never been done before. Further, the softmax layer 222 determines accuracy of the Pinyin pronunciation of each audio frame, and the CTC decoder 224 determines accuracy of a sentence by speech recognition. By incorporating the generation of the Pinyin transcript 206' by the CTC decoder 224, the stability and effectiveness of the acoustic feature extractor 200 (110) are dramatically improved. The procedure shown in FIG. 2B is only used in training stage of the acoustic feature extractor 200, not for inference stage. Because after well training, the procedures shown in FIG. 1 only need the acoustic feature 220 (112), which is the feature vector(s) outputted by the LSTM layers 218.

Figure 3:
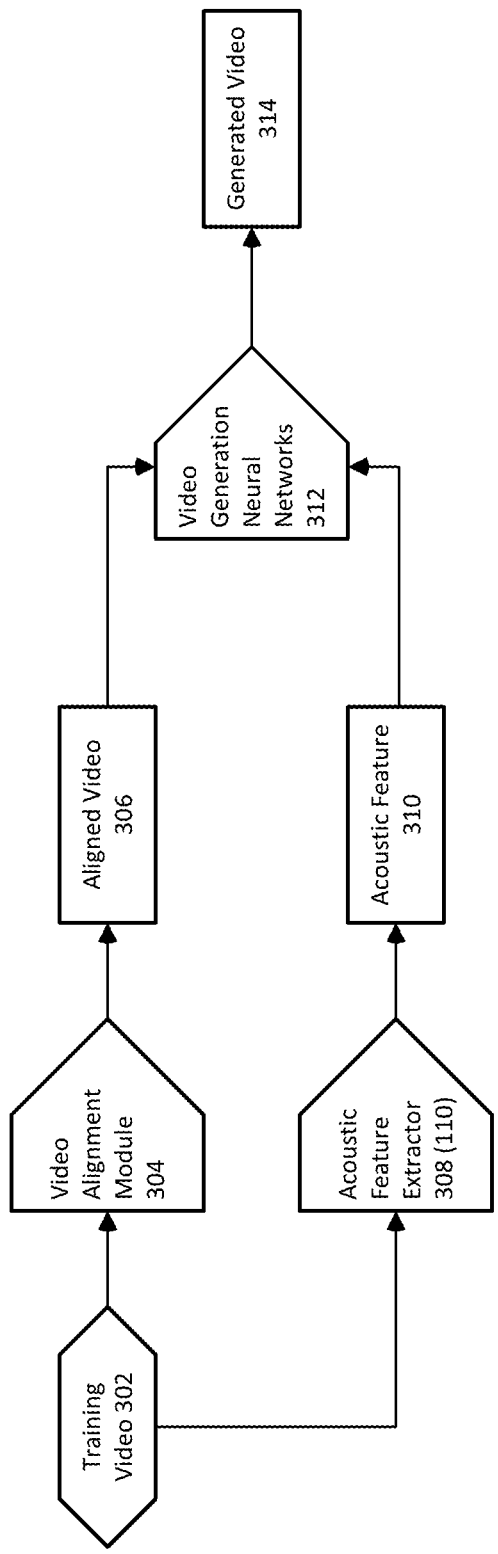
FIGS. 3-5 schematically depict training of a video generation neural network according to certain embodiments of the present disclosure.

Referring back for FIG. 1, the well trained acoustic feature extractor 110 provides the generated acoustic feature 112 to the video generation neural network 114. Kindly note that the video generation neural network 114 is pretrained, and the training of the video generation neural network 114 is shown in FIG. 3. Here the video generation neural network 312 shown in FIG. 3 is a coded module, and the video generation neural network 114 shown in FIG. 1 is the well-trained version of the module 312. As shown in FIG. 3, the training of the video generation neural network 312 requires the alignment of the training video 302 by video alignment module 304, and requires the extraction of acoustic feature 310 by the well trained acoustic feature extractor 308 (110). As shown in FIG. 3, for training the video generation neural network 312, a training video 302 is provided. In certain embodiments, the training video 302 includes only one video of a speaker. In certain embodiments, the training video 302 may include 2-20 videos, for example, 10 videos from 10 different speakers. In certain embodiments, the system of the present disclosure may also use many training videos, such as about 100-1000 training videos, such that common features from different speakers can be learned. However, the system of the present disclosure performs well with one or a small number of training videos 302, which is advantageous over other methods that require a large number of training videos. In certain embodiments, each video may be a short video with limited length, such as one minutes to 30 minutes. In certain embodiments, the length of the training video 302 is two to 15 minutes. In certain embodiments, the length of the training video 302 is about five minutes.

The training video 302 may include one video by one speaker, or a few videos by a few speakers. Each training video 302 may be separated into short sections, and each section can be used as a training sample. For example, if the training video 302 includes one five minutes video, the video may be divided into 60 five second videos, and each five second video is regarded as a training sample.

Figure 4:
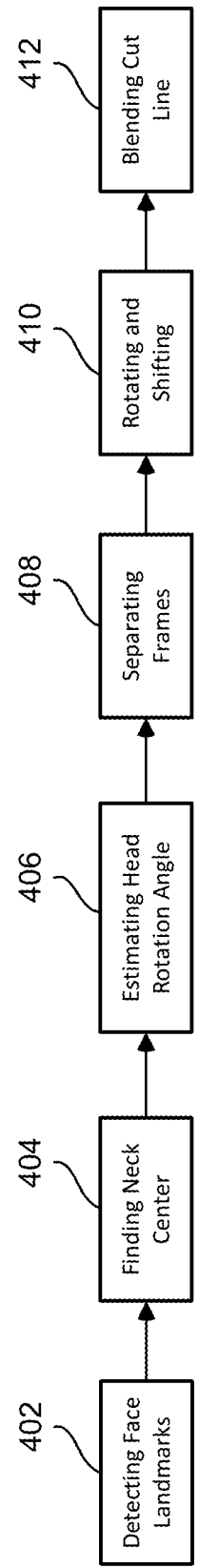

During training, as shown in FIG. 3, each training sample of the training video 302 is processed by the video alignment module 304 to generated aligned video 306. FIG. 4 schematically depicts the process of aligning the training video 302. As described above, each training sample is a short video having a plurality of video frames. Each video frame shows a taking person or a speaker in the frame. For each video frame as a target, at procedure 402, the video alignment module 304 detects facial landmarks of the speaker in the target video frame. For example, the face in each video frame may be detected using 68-points facial landmarks defined by Dlib.

At procedure 404, the video alignment module 304 finds the neck center by edge detection. In certain embodiments, the video alignment module 304 defines the neck in the shape of trapezoid, and defines the center of the trapezoid as the neck center. In certain embodiments, the video alignment module 304 may also define the neck center based on the features of detected points on the neck.

At procedure 406, the video alignment module 304 then uses the first video frame in the training video as the reference frame, and estimates rotation angle of the head in the target video frame relative to the pose of the head in the first video frame. The estimation may be performed using the detected facial landmarks. In certain embodiments, the video alignment module 304 may also define another video frame, such as the center video frame in the training sample as the reference video frame.

At procedure 408, the video alignment module 304 then draws a horizontal line crossing the center point, and cuts the target vide frame into an upper-half part and a lower-half part using the horizontal line.

At procedure 410, the video alignment module 304 uses affine warping method to rotate the upper-half part by the angle estimated in the procedure 406, so that after rotation, the head in the target video frame has the same pose as the head in the reference video frame.

After rotation of the upper-half part, the neck center of the upper-half part and the neck center of the lower-half part may not be the same as the neck center of the reference video frame. Therefore, the video alignment module 304 subsequently shifts the upper-half part and the lower-half part horizontally and optionally vertically to align the neck centers of the upper-half part and the lower-half part to the neck center in the reference video frame.

After rotation of the upper-half part and shift of the upper-half part and lower-half part, at procedure 412, the video alignment module 304 blends the pixels along both sides of the horizontal cutting line to make the processed image more natural.

The video alignment module 304 processes each of the video frames in the training sample other than the reference video frame, so that all the video frames in the training sample is aligned. In certain embodiments, one training video 302 of one speaker corresponding to several training samples is sufficient for training the video generation neural network 310. In other embodiments, a small number of training videos 302 of one speaker are required. In yet another embodiments, a small number of training videos 302 of several different speakers are required.

Referring back to FIG. 3, the acoustic feature extractor 308, which is well trained, extracts audio component of the training video 302 to obtain the acoustic feature 310. The audio component of the training video 302 is an audio wave containing audio frames. For example, if the length of each audio frame is 100 millisecond, then a one second audio would include 10 audio frames. The audio frames may be converted into frequency vectors using short-term Fourier transform (STFT), and each audio frame corresponds to one vector. By the processing of the acoustic feature extractor 308, the inputted vectors corresponding to the audio frames are converted into acoustic feature 310. The acoustic feature 310 may also be in the form of vectors, which contains phoneme information of the audio component, but not the specific character of the speaker.

The video generation neural network 312 receives the aligned video 306 and the acoustic feature 310, and uses the acoustic feature 310 and one video frame from the aligned video 306 (or one video frame from the training video 302) to generate video 314. In certain embodiments, the video generation neural network 312 may also use a high resolution image of the speaker in the aligned video 306, instead of using one video frame from the aligned video 306. By comparing the generated video 314 with the aligned video 306, the training of the video generation neural network 312 is performed. By rounds of training using the training samples, the parameters of the video generation neural network 312 are optimized, such that the generated video 314 based on the acoustic feature 308 and one video frame of the aligned video 306 is the same as or very similar to the aligned video 306.

Figure 5:
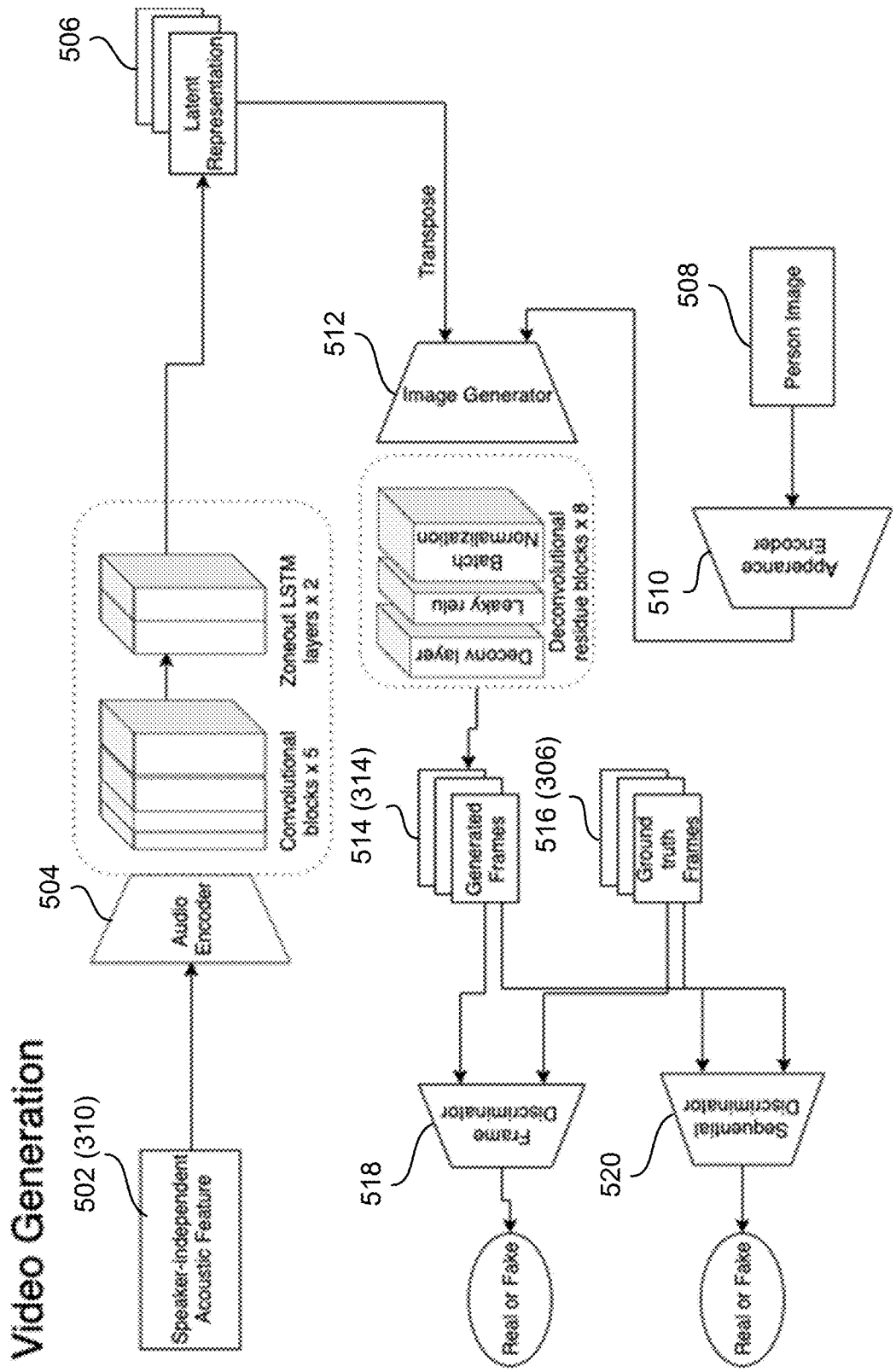

FIG. 5 schematically depicts structure details of the video generation neural network and training of the video generation neural network according to certain embodiments of the present disclosure. The components in FIG. 5, except the audio input 502, the image input 508, and the ground truth frames 516, correspond to the video generated neural network 312 shown in FIG. 3. As show in FIG. 5, the video generation neural network has an encoder-decoder structure. The speaker-independent acoustic feature tensor 502 (310), which is extracted by the well trained acoustic feature extractor 308 shown in FIG. 3, is used as input for audio encoder 504. The audio encoder 504 receives the speaker-independent acoustic feature tensor 502, and encodes the audio information into latent representation 506. The audio encoder 504, for example, can be a combination of convolutional layers and zoneout LSTM layers. The input for the latent representation 506 are frequency spectrum of the audio frames, and the output of the latent representation 506 are vectors. Each of the vectors corresponds to one of the audio frames, and the vectors are in a time sequence. The vectors with time sequence may be presented in a form of a matrix, and the matrix may need to be transposed to place the time dimensions in the front of the matrix, such that the transposed format meets the format requirement of Tensor-Flow used by the decoder. However, methods other than TensorFlow may be used by the decoder, and corresponding matrix formats of the latent representation 506 can be used.

The decoder, that is, the image generator 512, decodes each frame of the latent tensor into a red-green-blue (RGB) image. The image generator 512, for example, has a deconvolutional neural network. The image generator 512 also needs an inputted person image 508 of the target speaker. The person image 508 can be a high resolution image of the target speaker, or one video frame selected from the training video 302 or the aligned video 306. The selected video frame may be the first frame of the training video, or one of the video frames in the beginning of the training video where the speaker sits substantially still with eyes open. The person image 508 is encoded by an appearance encoder 510, and the encoded appearance is provided to the image generator 512 as input. The generated frames 514 are concatenated along time axis, and the concatenated image frames can be displayed as a video.

The image generator 512 focuses more on the low frequency part of the images, and the generated video 514 is usually a little bit blur. In order to solve the problem, the GAN based video generation neural network 312 pairs frame discriminator 518 and sequential discriminator 520 for the image generator 512. The discriminators can easily identify a blue video and penalize it. By incorporating GAN, the video generation neural network 312 can generate significantly sharper images and the videos.

Referring back to FIG. 1, when the acoustic feature extractor 110 is well trained as shown in FIGS. 2A-2B, and the video generation neural network 114 is well trained as shown in FIGS. 3-5, the well trained acoustic feature extractor 110 and the video generation neural network 114 are used to generate high quality generated video 116. The quality of the generated video 116 may be sufficient as the photorealistic video of a person speaking a text.

Figure 6:
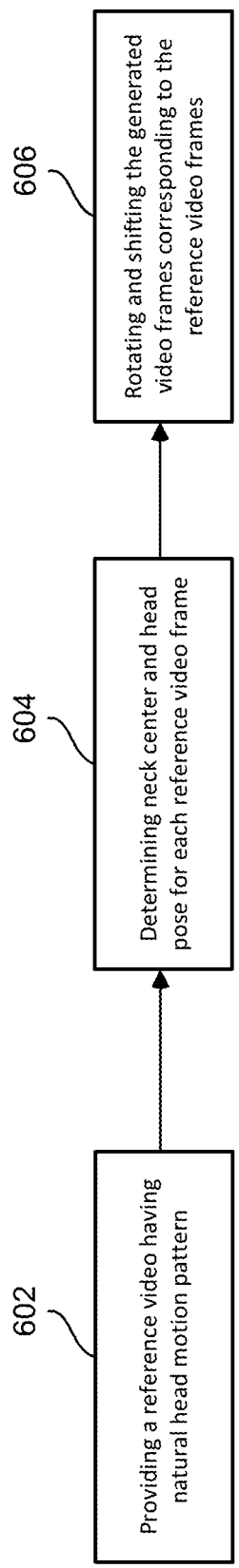
FIG. 6 schematically depicts adding head movement to a photo-realistic video according to certain embodiments of the present disclosure.

In certain embodiments, the generated video 116 may be further improved by applying at least one of natural head movement and eye blink to the generated video 116. FIG. 6 schematically depicts incorporating natural head movement to the generated video 116 according to certain embodiments of the present disclosure. As shown in FIG. 6, the incorporation includes procedures 602 to 606. At procedure 602, the system finds a short, real and natural talking video as reference, which may be selected from one of the training sample. The head movement in the reference video corresponds to a complete natural head movement pattern.

Assume the short reference video has N frames, and for each frame in the reference video, at procedure 604, the natural head moving model 118 detects face landmarks, finds neck center, and determines pose of the head. Here N is a positive integer, and the N frames correspond to a complete natural head movement pattern.

At procedure 606, the natural head moving model 118 picks N frames from the generated video 116, and makes the connection between the N frames in the generated video 116 and the N frames in the reference video one by one in a sequential order. In other words, the ith generated video frame of the N frames corresponds to the ith reference video frame, where i is a positive integer in the range of 1 to N. The natural head moving model 118 detects face landmarks in the ith generated video frame, finds neck enter, estimates head rotation angle relative to the head pose in the ith reference video frame, cuts the frame along the horizontal line crossing the neck center into upper-half part and lower-half part, rotates the upper-half part such that the head pose of the ith generated video frame is the same as the pose of the head of the ith reference video frame, and shifts the upper-half part and the lower-half part so that the neck center of the upper-half part and the neck center of the lower-half part of the ith generated video frame overlap with the neck center of the ith reference video frame. By aligning the N video frames of the generated video respectively to the N frames of the reference video, the generated video now has natural head movement.

In certain embodiments, there is no need to align the generated video frames to the reference video frames. Instead, the natural head movement in the reference video may be defined by rotation angles of the heads in the frames, and the generated video frames are rotated to the corresponding defined rotation angles of the heads.

In certain embodiments, the generated video 116 may be divided into as many N frame sections as possible from the beginning of the generated video 116, and each section can be added with a head movement pattern as described above. By this process, the whole generated video 116 will include head movement patterns all through the video.

In certain embodiments, the reference video may not be required, and the natural head moving model 118 defines head movement according to a rule. For example, for a number of generated video frames, the natural head moving model 118 may rotate the upper half parts of the frames periodically in a range from negative five degrees to positive five degrees relative to a central head pose, so as to achieve the effect that the head moves naturally in the generated video.

In addition to head movement, natural facial expressions such as blinks play crucial roles in producing realistic characters, and certain embodiments of the present disclosure can automatically learn the natural facial expression from the training datasets. However, with a relatively small training dataset, the learned generated video may contain facial expressions that are lack of eye blinks. In order to improve the generated video, in certain embodiments, the present disclosure explicitly learns blink patterns from training dataset, and seeks to automatically add blinks on top of the generated videos.

Figure 7:
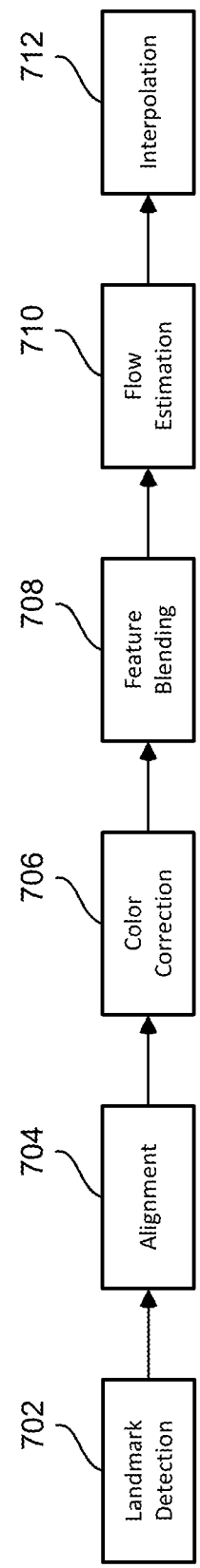
FIG. 7 schematically depicts adding blink to a photo-realistic video according to certain embodiments of the present disclosure.

FIG. 7 schematically depicts incorporating eye blink to the generated video 116 with natural head movement (or the generated video 116) according to certain embodiments of the present disclosure. In certain embodiments, the blink model 120 defines the frequency of blinks as 0.4 blink per second, and defines the length of one blink as seven frames. In certain embodiments, due to the number of frames per second varies, the number of length of one blink may vary.

As shown in FIG. 7, at procedure 702, the blink model 120 selected a closed eye video frame from for example one of the training videos, finds seven sequential video frames from the generated video 116 to add a blink, defines the middle video frame of the seven video frames as the keyframe, and detects landmarks from the closed eye video frame and the keyframe. In certain embodiments, the head pose of the keyframe is preferably the same or close to the head pose of the closed eye video frame.

At procedure 704, the blink model 120 aligns the closed eye video frame to the keyframe. The alignment may involve rotating, scaling, and translating of the closed eye video frame onto the keyframe.

At process 706, the blink model 120 adjusts the color balance between the closed eye video frame and the keyframe.

At process 708, the blink model 120 blends eye area features from the closed eye video frame on top of the keyframe.

At process 710, the blink model 120 estimates optical flow between the keyframe and the adjacent frames. The adjacent frames may include, for example, the three generated frames immediately before the keyframe, and the three generated frames immediately after the keyframe.

At procedure 712, the blink model 120 replaces the eye areas in the adjacent frames based on the estimated optical flow. By the replacement, the seven frames constitute a blink. Based on the frequency or the time length of the frames, the number of the frames for a blink may vary. In certain embodiments, the system may incorporate the number of blinks based on the frequency of 0.4 blink per second. Here the replacement is also named interpolation where the disclosure interpolates the eye areas based on the estimated optical flow to the eye areas of the seven frames.

In certain embodiments, referring back to FIG. 1, both incorporating the natural head movement and incorporating the blink as shown in FIG. 6 and FIG. 6 may be optional, and the sequence of performing FIG. 6 and FIG. 7 may vary. In certain embodiments, the generated video 116 is first subjected to natural head movement process, and then subjected to the blink process. After incorporation of natural head movement and the blink into the generated video 116, the photo-realistic video of a talking person 122 is obtained.

In certain embodiments, we may only need a five minutes training video of a speaker to train the video generating neural network as shown in FIG. 3, and one frame such as the first frame from the training video can be used as the image 104 for generating the photo-realistic video 122 of that speaker. Therefore, the system of the present disclosure is simple, the system only requires a small training dataset, the training and generation are efficient, and the final generated video is photo-realistic. Kindly note that although the training video may only be the five minute video, the video may be divided into shorter video sections, and the training is iteratively performed using each of the short video sections as one training sample.

Figure 8:
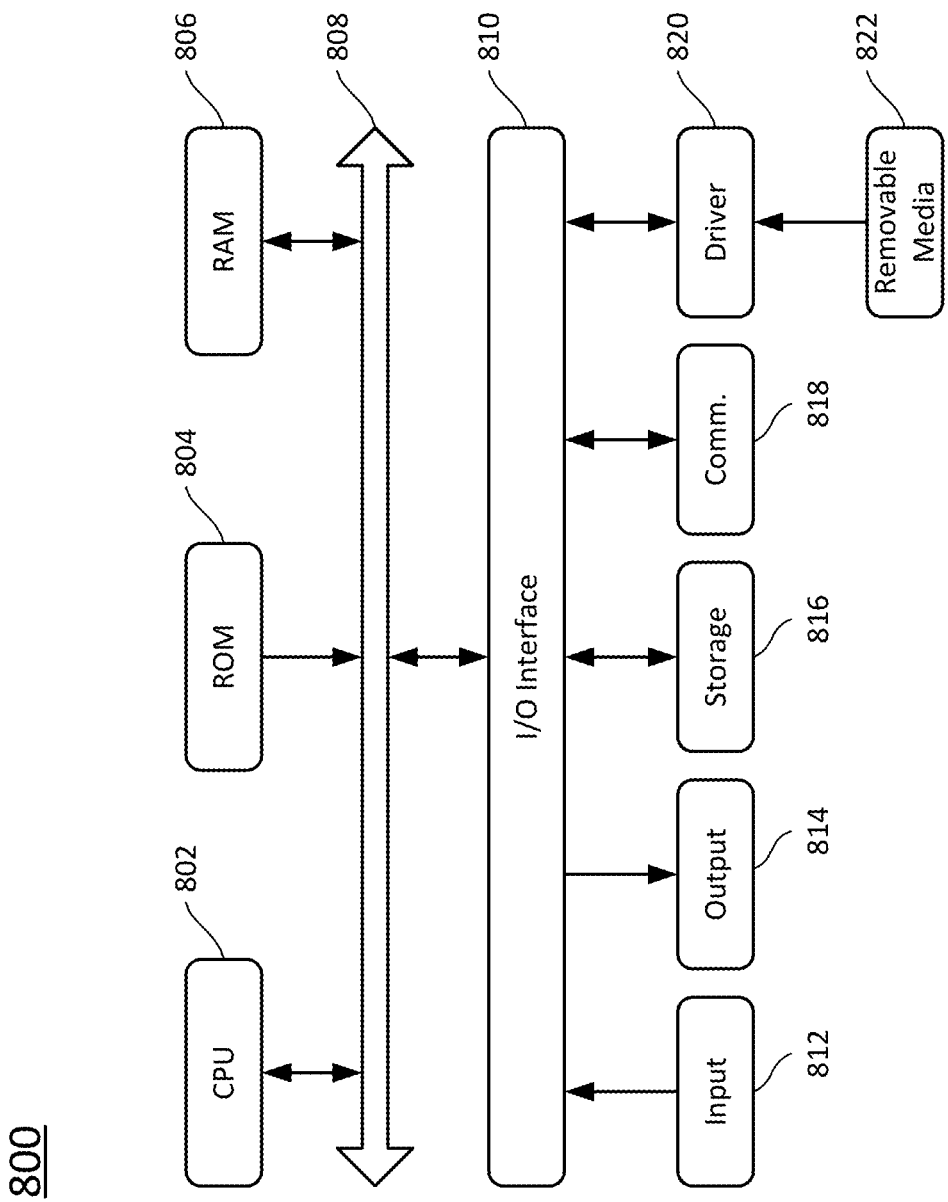
FIG. 8 schematically depicts a computing device according to certain embodiments of the present disclosure.

FIG. 8 schematically depicts a computing device for generating a photo-realistic video according to certain embodiments of the present disclosure. As shown in FIG. 8, the computing device 800 includes a central processing unit (CPU) 802. The CPU 802 is configured to perform various actions and processes according to programs stored in a read only memory (ROM) 804 or loaded into a random access memory (RAM) 806 from storage 816. The RAM 806 has various programs and data necessary for operations of the computing device 800. The CPU 802, the ROM 804, and the RAM 806 are interconnected with each other via a bus 808. Further, an I/O interface 810 is connected to the bus 808.

In certain embodiments, the computing device 800 further includes at least one or more of an input device 812 such as keyboard or mouse, an output device 814 such as liquid crystal display (LCD), light emitting diode (LED), organic light emitting diode (OLED) or speaker, the storage 816 such as hard disk drive (HDD) or solid state drive (SSD), and a communication interface 818 such as LAN card or modem, connected to the I/O interface 810. The communication interface 818 performs communication through a network such as Internet. In certain embodiments, a driver 820 is also connected to the I/O interface 810. A removable media 822, such as HDD, optical disk, DDD or semiconductor memory, may be mounted on the driver 820, so that programs stored thereon can be installed into the storage 708.

In certain embodiments, the process flow described herein may be implemented in software. Such software may be downloaded from the network via the communication interface 818 or read from the removable media 822, and then installed in the computing device. The computing device 800 will execute the process flow when running the software. In certain embodiments, the software is named the system, which includes encoding of the multi-speaker speech synthesize 106, the acoustic feature extractor 110, the video generation neural network 114, the natural head moving model 118 and blink model 120, the HMM based forced aligner 210, and the video alignment module 304. The software or the system, when executed by the CPU 802, performs the functions shown in FIGS. 1-7.

FIG. 9 schematically depicts a method for training an acoustic feature extractor according to certain embodiments of the present disclosure. In certain embodiments, the method is implemented by the computing device 800 shown in FIG. 8. It should be particularly noted that, unless otherwise stated in the present disclosure, the steps of the method may be arranged in a different sequential order, and are thus not limited to the sequential order as shown in FIG. 9. In certain embodiments, the method shown in FIG. 9 is described in reference to FIG. 2A and FIG. 2B.

As shown in FIG. 9, at procedure 902, the system provides the ASR training datasets 202. Each training dataset 202 includes an audio wave 208 and a Chinese transcript 204. The Chinese transcript 204 is converted to Pinyin transcript 206.

At procedure 904, the Pinyin transcript 206 and the audio wave 208 are inputted to the HMM based forced aligner 210, and the HMM based forced aligner 210 aligns the Pinyin transcript 206 with the audio wave 208 to obtain each phoneme's start and end timestamp 212. The Pinyin transcript 206, the audio wave 208, and the phonemes' start and end timestamp 212 are used to train the acoustic feature extractor 200.

At procedure 906, the system converts the audio wave 208 into audio vectors, and subjecting the audio vectors to the CNN layers 216 and the LSTM layers 218 to learn acoustic feature 220. The acoustic feature 220 is speaker independent.

At procedure 908, the system generates each phoneme's start and stop timestamp 212' from the acoustic feature 220 using the softmax layer 222.

At procedure 910, the system generates the Pinyin transcript 206' from the acoustic feature 220 using the CTC decoder 224.

At procedure 912, by comparing the generated Pinyin transcript 206' with the Pinyin transcript 206, and comparing the generated phonemes' start and stop timestamps 212' with the phonemes' start and stop timestamps 212, the system can optimize the parameters of the acoustic feature extractor 200. After training, the well trained acoustic feature extractor 200 (110) can be used to train the video generation neural network 312.

FIG. 10 schematically depicts a method for training video generation neural network according to certain embodiments of the present disclosure. In certain embodiments, the method is implemented by the computing device 800 shown in FIG. 8. It should be particularly noted that, unless otherwise stated in the present disclosure, the steps of the method may be arranged in a different sequential order, and are thus not limited to the sequential order as shown in FIG. 10. In certain embodiments, the method shown in FIG. 10 is described in reference to FIGS. 3-5.

As shown in FIG. 10, at procedure 1002, the system provides the training video 302. The training video 302 may include one or more videos of a person or speaker. The training video 302 includes an audio component and a video component.

At procedure 1004, the well trained acoustic feature extractor 308 extracts acoustic feature 310 from the audio components of the training video 302. The acoustic feature 310 is speaker independent.

At procedure 1006, the video alignment module 304 aligns the training video 302 to obtain aligned video 306. The details of the alignment is shown in FIG. 4.

At procedure 1008, upon receiving the image 104, which could be one frame from the training video 302 or the aligned video 306, or a separate image, and receiving the acoustic feature 310, the video generation neural network 312 obtains generated video 314.

At procedure 1010, the video generation neural network 312 compares the generated video 314 with the aligned video 306 based on GAN, to optimize the parameters of the video generation neural network 312. In certain embodiments, the details of video generation, video comparison, and optimizing parameters are shown in FIG. 5.

After training, the well trained acoustic feature extractor 200 (308, 110) and the well trained video generation neural network 312 (114) can be used to generate a photo-realistic video.

Figure 11:
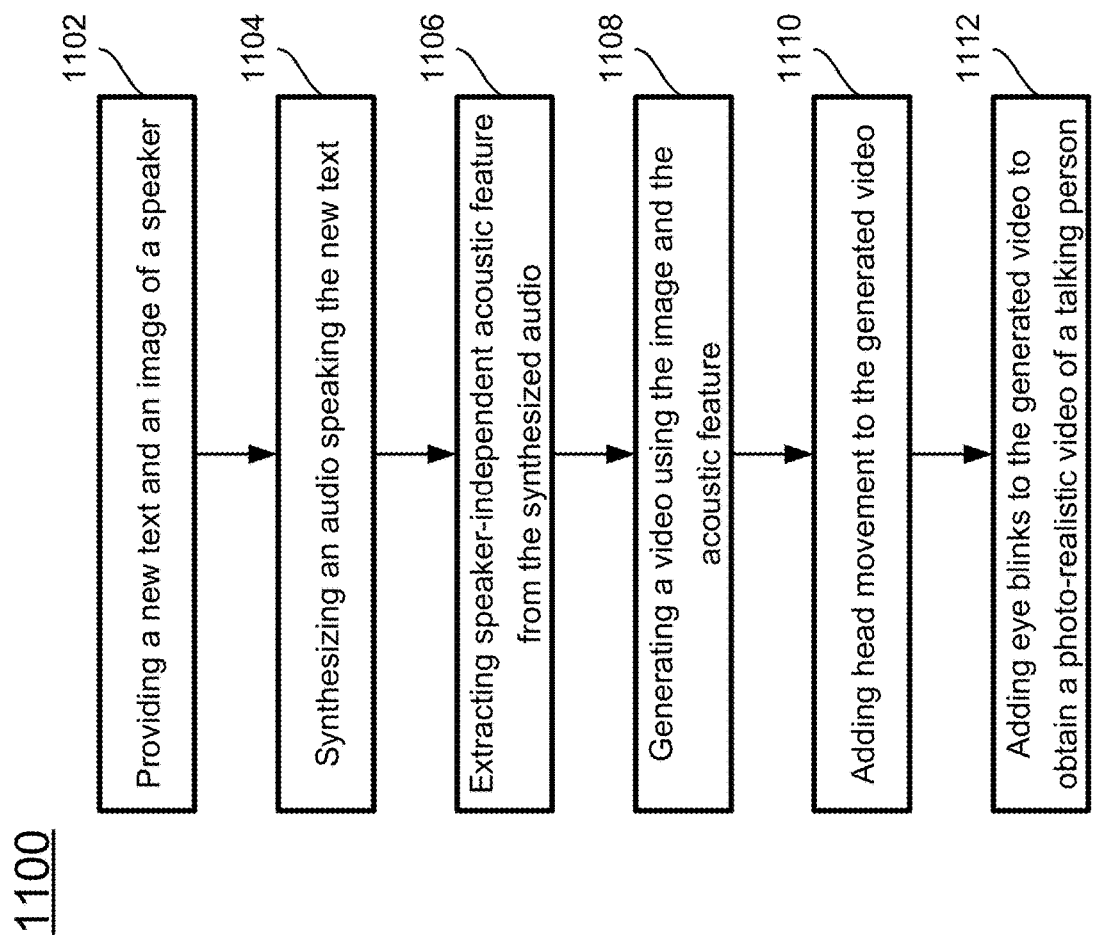
FIG. 11 schematically depicts a method for generating a photo-realistic video using trained acoustic feature extractor and trained video generation neural network according to certain embodiments of the present disclosure.

FIG. 11 schematically depicts a method for generating photo-realistic video according to certain embodiments of the present disclosure. In certain embodiments, the method is implemented by the computing device 800 shown in FIG. 8. It should be particularly noted that, unless otherwise stated in the present disclosure, the steps of the method may be arranged in a different sequential order, and are thus not limited to the sequential order as shown in FIG. 11. In certain embodiments, the method shown in FIG. 11 is described in reference to FIG. 1.

As shown in FIG. 11, at procedure 1102, the system provides the new text 102 to the multi-speaker speech synthesizer 106 and provides the image 104 of a speaker to the video generation neural network 114.

At procedure 1104, upon receiving the new text 102, the multi-speaker speech synthesizer 106 synthesizes the audio 108, and sends the audio 108 to the acoustic feature extractor 110. The voice of the audio 108 may correspond to the voice to one of the speakers provided in the multi-speaker speech synthesizer 106, and the speaker may have been designated by a user when using the multi-speaker speech synthesizer 106.

At procedure 1106, upon receiving the audio 108, the acoustic feature extractor 110 extracts speaker-independent acoustic feature 112, and sends the acoustic feature 112 to the video generation neural network 114.

At procedure 1108, upon receiving the image 104 and the acoustic feature 112, the video generation neural network 114 generates the generated video 116 to the natural head moving model 118.

At procedure 1110, upon receiving the generated video 116, the natural head moving model 118 adds head movement to the generated video 116 to obtain generated video with head movement, and sends the generated video with head movement to the blink model 120. The details of adding head movement can be seen in FIG. 6 and its corresponding description above.

At procedure 1112, upon receiving the generated video with head movement, the blink model 120 adds blinks to the generated video with head movement, and obtains the photo-realistic video of a talking person 122. The details of adding blinks can be seen in FIG. 7 and its corresponding description above.

In certain aspects, the present disclosure relates to a non-transitory computer readable medium storing computer executable code. In certain embodiments, the computer executable code may be the software stored in the storage 816 shown in FIG. 8. The computer executable code, when being executed, may perform one of the methods described above. In certain embodiments, the non-transitory computer readable medium may include, but not limited to, the storage 816 of the computing device 800 as described above, or any other storage media of the computing device 800.

Certain embodiments of the present disclosure, among other things, have the following beneficial advantages: (1) The acoustic feature extractor extracts speaker-independent audio features, and uses the audio features to drive the generation of the video. There is no need for a large amount of training data to generalize different speakers, and the videos can be generated using an unseen voice. (2) The jittering problem of generated video is solved by aligning the video during the training, and both the face and upper body of the speaker are provided in the generated video. (3) The system extracts strong sequential features, such as the head movement pattern, and uses the head movement pattern to the generated video, such that the generated video is smooth and natural. (4) The system incorporates blinks into the generated video with specific blink frequency and blink pattern, which makes the generated video real. (5) The system uses a encoder-decoder structure to capture finest changes of facial muscles and micro-expression, which makes the generated talking video natural. (6) The frame-level adversarial training with discriminator ensures details and realities of the generated video. (7) The natural facial expression can be achieved using limited training data. (8) The system only needs consumer cameras other than expensive 3D scanning devices, and the cost of the whole system is low.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method for obtaining a photo-realistic video of a talking person from a text, comprising:
providing, by a computing device, the text for generating the photo realistic video and an image of the talking person;
synthesizing a speech audio from the text;
extracting an acoustic feature from the speech audio by an acoustic feature extractor, wherein the acoustic feature is independent from speaker of the speech audio; and
generating the photo-realistic video from the acoustic feature and the image of the talking person by a video generation neural network,
wherein the video generating neural network is pre-trained by:
providing a training video of a training talking person and a training image of the training talking person, wherein the training video comprises a plurality of training video frames and a corresponding training audio;
extracting a training acoustic feature from the training audio by the acoustic feature extractor;
generating a plurality of video frames from the training image and the training acoustic feature by the video generation neural network; and
comparing the generated video frames with ground truth video frames using generative adversarial network (GAN), wherein the ground truth video frames correspond to the training video frames.

2. The method of claim 1, wherein each of the ground truth video frames is prepared by:
separating, in corresponding one of the training video frames, outline of the training talking person into a head portion and an upper torso portion;
rotating the head portion to be consistent with a head pose in a reference frame selected from the training video frames;
shifting the head portion and the upper torso portion to be consistent with positions of a head portion and an upper torso portion in the reference frame; and
blending pixels along an interface between the head portion and the upper torso portion in the ground truth video frame.

3. The method of claim 1, wherein the step of comparing the generated video frames with the ground truth video frames using GAN comprises:
comparing each of the generated video frames with corresponding one of the ground truth video frames to determine quality of the generated video frame; and
comparing the generated video frames with the ground truth video frames to determined quality of sequential variation of the generated video frames.

4. The method of claim 1, wherein the video generation neural network comprises a batch normalization layer, a leaky relu layer, and a deconvolution layer.

5. The method of claim 1, wherein before pre-training of the video generating neural network, the acoustic feature extractor is pre-trained by:
providing a training audio wave, a training transcript corresponding to the training audio wave, and a training phoneme timestamp in the training audio wave;
transforming the training audio wave to Mel-frequency cepstral coefficients (MFCCs);
performing a convolutional neural network (CNN) and a long short-term memory (LSTM) on the MFCCs to obtain a training audio wave vector;
performing a softmax analysis on the training audio wave vector to obtain a predicted phoneme timestamp;
performing a connectionist temporal classification (CTC) decoding on the training audio wave vector to obtain predicted transcript; and
comparing the predicted phoneme timestamp and the predicted transcript respectively with the training phoneme timestamp and the training transcript.

6. The method of claim 5, wherein the training phoneme timestamp is obtained by performing a hidden Markov model (HMM) based force alignment on the training transcript and the training audio wave.

7. The method of claim 6, wherein training script comprises a Chinese character script and a Pinyin script corresponding to pronunciation of the Chinese character script.

8. The method of claim 1, wherein the step of synthesizing the speech audio from the text is performed by a multi-speaker speech synthesizer.

9. The method of claim 1, further comprising, after generating the photo-realistic video by the video generation neural network:
providing a head moving pattern;
separating outline of the talking person in each of frames of the photo-realistic video into a head portion and an upper torso portion;
rotating the head portion in each of the frames to be consistent with the head moving pattern;
shifting the head portion and the upper torso portion in each of the frames to be consistent with positions of head portion and upper torso portion in the head moving pattern; and
blending pixels along an interface between the head portion and the upper torso portion in each of the frames.

10. The method of claim 1, further comprising, after generating the photo-realistic video by the video generation neural network:
providing a closed-eye frame with closed eyes;
detecting facial landmarks in a target frame of the photo-realistic video, wherein the target frame and a plurality of frames before and after the target frame have open eyes;
rotating, scaling, and translating the closed-eye frame onto the target frame;
adjusting color balance between the closed-eye frame and the target frame;
blending eye area features form the closed-eye frame on top of the target frame;
estimating optical flow between the target frame and an adjacent frame, wherein the adjacent frame is after the target frame and within a pre-determined number of frames in the photo-realistic video; and
interpolating frames between the target frame and the adjacent frame based on the optical flow.

11. A system for generating a photo-realistic video of a talking person from a text, wherein the system comprises a computing device, the computing device comprises a processor and a storage device storing computer executable code, the computer executable code comprises an acoustic feature extractor and a video generation neural network, and the computer executable code, when executed at the processor, is configured to:
provide the text for generating the photo-realistic video and an image of the talking person;
synthesize a speech audio from the text;
extract an acoustic feature from the speech audio by the acoustic feature extractor, wherein the acoustic feature is independent from speaker of the speech audio; and
generate the photo-realistic video from the acoustic feature and the image of the talking person by the video generation neural network,
wherein the video generating neural network is pre-trained by:
providing a training video of a training talking person and a training image of the training talking person, wherein the training video comprises a plurality of training video frames and a corresponding training audio;
extracting a training acoustic feature from the training audio by the acoustic feature extractor;
generating a plurality of video frames from the training image and the training acoustic feature by the video generation neural network; and
comparing the generated video frames with ground truth video frames using generative adversarial network (GAN), wherein the ground truth video frames correspond to the training video frames.

12. The system of claim 11, wherein each of the ground truth video frames is prepared by:
separating, in corresponding one of the training video frames, outline of the training talking person into a head portion and an upper torso portion;
rotating the head portion to be consistent with a head pose in a reference frame selected from the training video frames;
shifting the head portion and the upper torso portion to be consistent with positions of a head portion and an upper torso portion in the reference frame; and
blending pixels along an interface between the head portion and the upper torso portion in the ground truth video frame.

13. The system of claim 11, wherein the step of comparing the generated video frames with the ground truth video frames using GAN comprises:
comparing each of the generated video frames with corresponding one of the ground truth video frames to determine quality of the generated video frame; and
comparing the generated video frames with the ground truth video frames to determined quality of sequential variation of the generated video frames.

14. The system of claim 11, wherein before pre-training of the video generating neural network, the acoustic feature extractor is pre-trained by:
providing a training audio wave, a training transcript corresponding to the training audio wave, and a training phoneme timestamp in the training audio wave;
transforming the training audio wave to Mel-frequency cepstral coefficients (MFCCs);
performing a convolutional neural network (CNN) and a long short-term memory (LSTM) on the MFCCs to obtain a training audio wave vector;
performing a softmax analysis on the training audio wave vector to obtain a predicted phoneme timestamp;
performing a connectionist temporal classification (CTC) decoding on the training audio wave vector to obtain predicted transcript; and
comparing the predicted phoneme timestamp and the predicted transcript respectively with the training phoneme timestamp and the training transcript.

15. The system of claim 14, wherein the training phoneme timestamp is obtained by performing a hidden Markov model (HMM) based force alignment on the training transcript and the training audio wave.

16. The system of claim 11, wherein the computer executable code is further configured to, after generating the photo-realistic video:
provide a head moving pattern;
separate outline of the talking person in each of frames of the photo-realistic video into a head portion and an upper torso portion;
rotate the head portion in each of the frames to be consistent with the head moving pattern;

shift the head portion and the upper torso portion in each of the frames to be consistent with positions of head portion and upper torso portion in the head moving pattern; and blend pixels along an interface between the head portion and the upper torso portion in each of the frames.

17. The system of claim 11, wherein the computer executable code is further configured to, after generating the photo-realistic video by the video generation neural network:

provide a closed-eye frame with closed eyes;

detect facial landmarks in a target frame of the photo-realistic video, wherein the target frame and a plurality of frames before and after the target frame have open eyes;

rotate, scale, and translate the closed-eye frame onto the target frame;

adjust color balance between the closed-eye frame and the target frame;

blend eye area features form the closed-eye frame on top of the target frame;

estimate optical flow between the target frame and an adjacent frame, wherein the adjacent frame is after the target frame and within a pre-determined number of frames in the photo-realistic video; and interpolate frames between the target frame and the adjacent frame based on the optical flow.

18. A non-transitory computer readable medium storing computer executable code, wherein the computer executable code comprises an acoustic feature extractor and a video generation neural network, and the computer executable code, when executed at a processor of a computing device, is configured to:

provide the text for generating the photo-realistic video and an image of the talking person;

synthesize a speech audio from the text;

extract an acoustic feature from the speech audio by the acoustic feature extractor, wherein the acoustic feature is independent from speaker of the speech audio; and generate the photo-realistic video from the acoustic feature and the image of the talking person by the video generation neural network, wherein the video generating neural network is pre-trained by:

providing a training video of a training talking person and a training image of the training talking person, wherein the training video comprises a plurality of training video frames and a corresponding training audio;

extracting a training acoustic feature from the training audio by the acoustic feature extractor;

generating a plurality of video frames from the training image and the training acoustic feature by the video generation neural network; and comparing the generated video frames with ground truth video frames using generative adversarial network (GAN), wherein the ground truth video frames correspond to the training video frames.

19. The non-transitory computer readable medium of claim 18, wherein each of the ground truth video frames is prepared by:

separating, in corresponding one of the training video frames, outline of the training talking person into a head portion and an upper torso portion;

rotating the head portion to be consistent with a head pose in a reference frame selected from the training video frames;

shifting the head portion and the upper torso portion to be consistent with positions of a head portion and an upper torso portion in the reference frame; and blending pixels along interface between the head portion and the upper torso portion in the ground truth video frame.

20. The non-transitory computer readable medium of claim 18, wherein before pre-training of the video generating neural network, the acoustic feature extractor is pre-trained by:

providing a training audio wave, a training transcript corresponding to the training audio wave, and a training phoneme timestamp in the training audio wave;

transforming the training audio wave to Mel-frequency cepstral coefficients (MFCCs);

performing a convolutional neural network (CNN) and a long short-term memory (LSTM) on the MFCCs to obtain a training audio wave vector;

performing a softmax analysis on the training audio wave vector to obtain a predicted phoneme timestamp;

performing a connectionist temporal classification (CTC) decoding on the training audio wave vector to obtain predicted transcript; and comparing the predicted phoneme timestamp and the predicted transcript respectively with the training phoneme timestamp and the training transcript.

\* \* \* \* \*